United States Patent [19]
Johnson

[11] 4,182,127
[45] Jan. 8, 1980

[54] POWER RECOVERY AND FEEDBACK SYSTEM

[76] Inventor: Robert H. Johnson, One Crown Cir., Bronxville, New York, N.Y. 10708

[21] Appl. No.: 859,800

[22] Filed: Dec. 12, 1977

[51] Int. Cl.² ............................................. F01K 23/06
[52] U.S. Cl. ..................................... 60/618; 417/364; 417/374; 417/380; 60/716
[58] Field of Search ................. 60/614, 616, 618, 641, 60/676, 655, 716, 718; 417/374, 364, 380

[56] References Cited

U.S. PATENT DOCUMENTS

| | | | |
|---|---|---|---|
| 573,958 | 12/1896 | Bates | 60/618 |
| 3,950,949 | 4/1976 | Martin et al. | 60/676 X |
| 3,962,873 | 6/1976 | Davis | 60/641 |
| 4,031,705 | 6/1976 | Berg | 60/618 X |

Primary Examiner—Allen M. Ostrager
Attorney, Agent, or Firm—Burgess, Ryan and Wayne

[57] ABSTRACT

A system for recovering otherwise lost power from a compressor and prime mover utilizing a Rankine cycle. While heat recovery from prime movers has been done, much energy is wasted by compressors which convert all the driving power to heat which has not been recovered. Thus, this invention provides for power recovery from both the prime mover and the compressor. A working fluid is pre-heated utilizing waste heat from the prime mover and compressor, such as that in the cooling medium, oil cooler, and the like. The pre-heated working fluid is passed to a boiler where it is vaporized and super heated and then is passed to a turbine or other type of expander. From the turbine, the working fluid goes to a condenser and is then pumped to the heat exchanger, or heat exchangers, to begin another cycle. The turbine or other type of expander is used to supplement the prime mover in driving the compressor or for any other suitable application of power.

10 Claims, 3 Drawing Figures

POWER RECOVERY AND FEEDBACK SYSTEM

BACKGROUND OF THE INVENTION

This invention relates to energy recovery and, more particularly, this invention relates to a method and apparatus for recovering otherwise lost energy from a compressor and prime mover.

Gas compressors such as air compressors are well-known in the art and are widely used in the construction industry. Such air compressors are typically driven by a Diesel engine, although compressors can also be driven by a gasoline engine, a gas turbine or from a Rankine cycle prime mover. For ease of discussion, the following description will refer to the Diesel engine in an exemplary manner, although it is to be distinctly understood that "prime mover" as used in this specification and the claims is meant to include any form of prime mover such as the Diesel engine, gasoline engine, gas turbine, Rankine cycle prime mover, or any other energy source.

A Diesel engine driving a compressor converts only one third of the heat content of the fuel being burned to useful energy, that is, power for driving the load. Of the remaining two-thirds, one third is converted to heat which is normally carried away in the engine cooling medium, usually water or air. The remaining third is converted to heat which is normally carried away in the engine exhaust gas. Thus, two-thirds of the potential recoverable energy is automatically lost as heat.

Then, of the energy transmitted to the compressor, all of the power delivered by the engine is converted back into heat. Specifically, all the shaft horsepower input to the compressor is converted to heat in one of six forms, namely, heat radiated from the frame, cylinders, coolers, and piping to the atmosphere; heat conducted from the frame to the foundation; heat carried from bearings by lubricating and cooling oil and radiated to the atmosphere or transferred to the cooling medium, such as water or air, for disposal; heat carried away by the cooling medium in the cylinder jackets; heat carried away by the cooling medium in intercoolers; and heat carried out of the compressor in the compressed gas as it leaves the system.

Thus, upon consideration of these factors, it becomes apparent that all the power for driving the compressor is converted back to heat and there is a startling opportunity for power recovery and feedback from all three thirds of the heat content of the fuel being burned. Recovery and use of heat from a prime mover has been accomplished in the prior art, but this has not been accomplished with a compressor in combination with a prime mover. Considering the present scarcity of fossil fuel and the projected critical scarcity in the foreseeable future, there is a glaring need for means to recover at least a portion of this wasted energy.

SUMMARY OF THE INVENTION

It is, therefore, a primary object of the present invention to provide a method and means for recovering wasted energy from a compressor system.

It is another object of the present invention to provide a method and means for easily and efficiently recovering otherwise wasted heat from a compressor system.

It is still another object of the present invention to provide a method and means for recovering otherwise wasted heat from a compressor system utilizing a Rankine cycle apparatus.

It is the recovery of otherwise wasted heat, and, therefore, power, from both the compressor and the prime mover that is the essence of this invention.

Consistent with the foregoing objects, otherwise wasted heat from a compressor system, including a compressor and a prime mover, is recovered by providing a Rankine cycle system which includes a boiler, a turbine, a condenser, and at least one heat exchanger. The working fluid of the Rankine cycle system is pumped through the heat exchanger to be pre-heated by the various sources of heat from the prime mover and compresser. For instance, from a Diesel engine, heat can be recovered from the oil cooler, the engine cooling medium, or the turbo-charger cooler. From the compressor, heat can be recovered from the cooling medium for the compressor per se, for the intercoolers, the aftercoolers, and the oil coolers. Additionally, since the complete compressor system is usually covered by a shroud for sound insulation, heat can be recovered from the shroud system. In fact, as an optional feature, solar panels can be provided to collect heat from sunlight for use in pre-heating the working fluid.

The working fluid is pre-heated taking heat from any of these various sources in one or more heat exchangers which can be arranged in series, in parallel, or in series-parallel. The pre-heated working fluid is passed to a boiler which is heated by engine exhaust gas to thereby vaporize and superheat the working fluid. The vaporized working fluid passes to a turbine, a cycloidal, reciprocating, or other type of expander, and then to a condenser where it is condensed back to a fluid and passed to the pump which feeds the heat exchanger to begin the cycle again. The power shaft of the turbine, or expander may be operatively connected to the main shaft of the Diesel engine in a manner well-known in the art or it may be connected to any other appropriate power consuming device. As the load on the prime mover and compressor varies, the heat supplied to the Rankine cycle system will vary and the unit "floats on the line."

The working fluid for the Rankine cycle system can be any material well-known in the art having a boiling point in the range necessary for use in the system. Exemplary of such working fluids are toluene, a Freon, or any other suitable fluid for low boiler temperatures.

DESCRIPTION OF THE DRAWINGS

The foregoing and other objects will become apparent when consideration is given to the following detailed description which makes reference to the annexed drawings, wherein.

DETAILED DESCRIPTION OF THE PREFERRED EMBODIMENT

Figure 1:
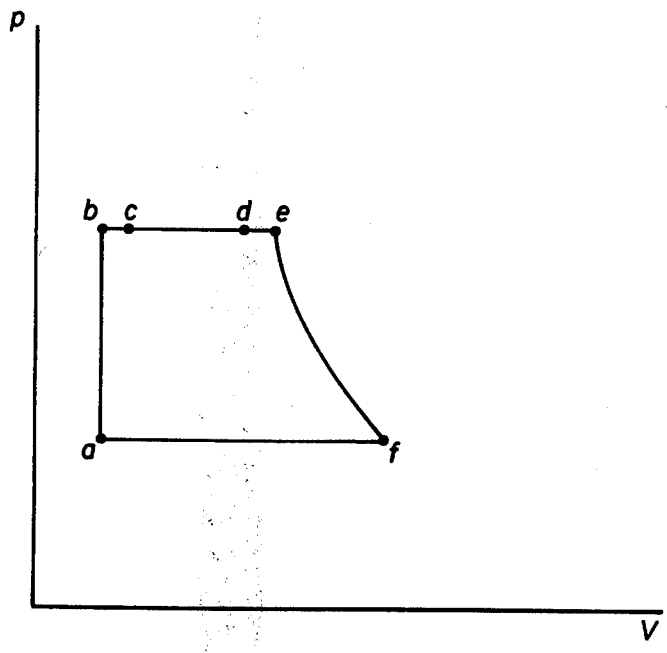
FIG. 1 is a pressure-volume diagram of a Rankine cycle.

Referring first to FIG. 1, the theoretical Rankine cycle is depicted. Starting with a working fluid at low pressure and temperature at point a, the working fluid is compressed adiabatically to point b at boiler pressure. The working fluid is then heated at constant pressure to its boiling point along line bc, converted to steam along line cd, superheated along line de, expanded adiabatically along line ef, and finally cooled and condensed along line fa, to its initial condition.

Figure 2:
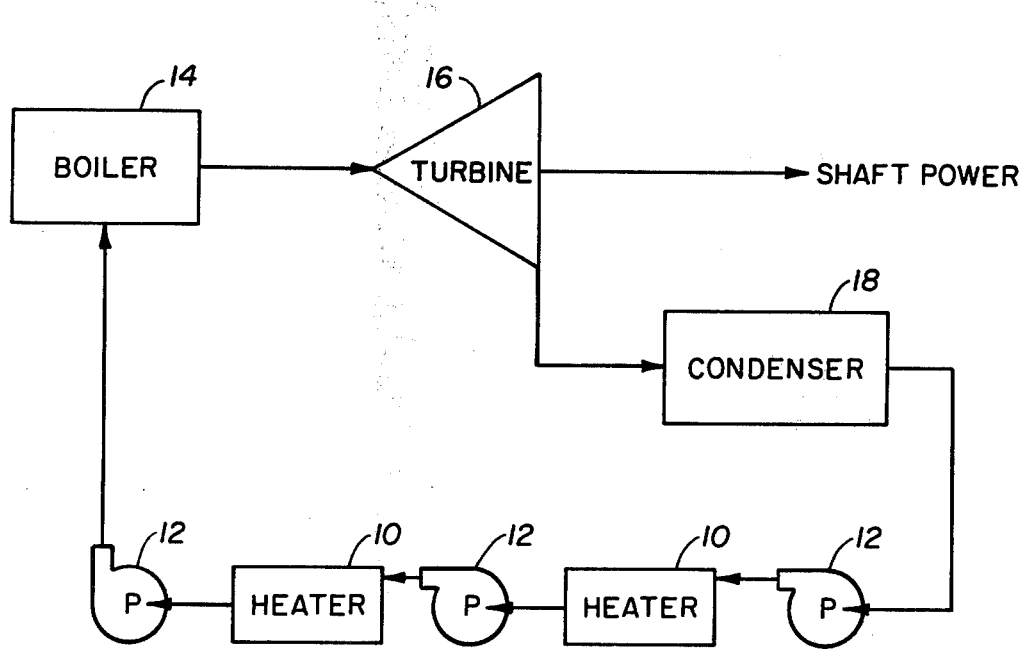
FIG. 2 is a schematic diagram of a typical Rankine cycle.

Referring now to FIG. 2, it will be seen that in the known apparatus for carrying out a Rankine cycle, which consists of a closed system, the working fluid is pumped to one or more heaters 10 by means of pumps 12 and then to a boiler 14 where it is vaporized and, preferably, superheated. The vapor then goes to a turbine 16 to drive the same with power being extracted from the turbine shaft. The working fluid then moves to condenser 18 where it is condensed and again begins the cycle.

Figure 3:
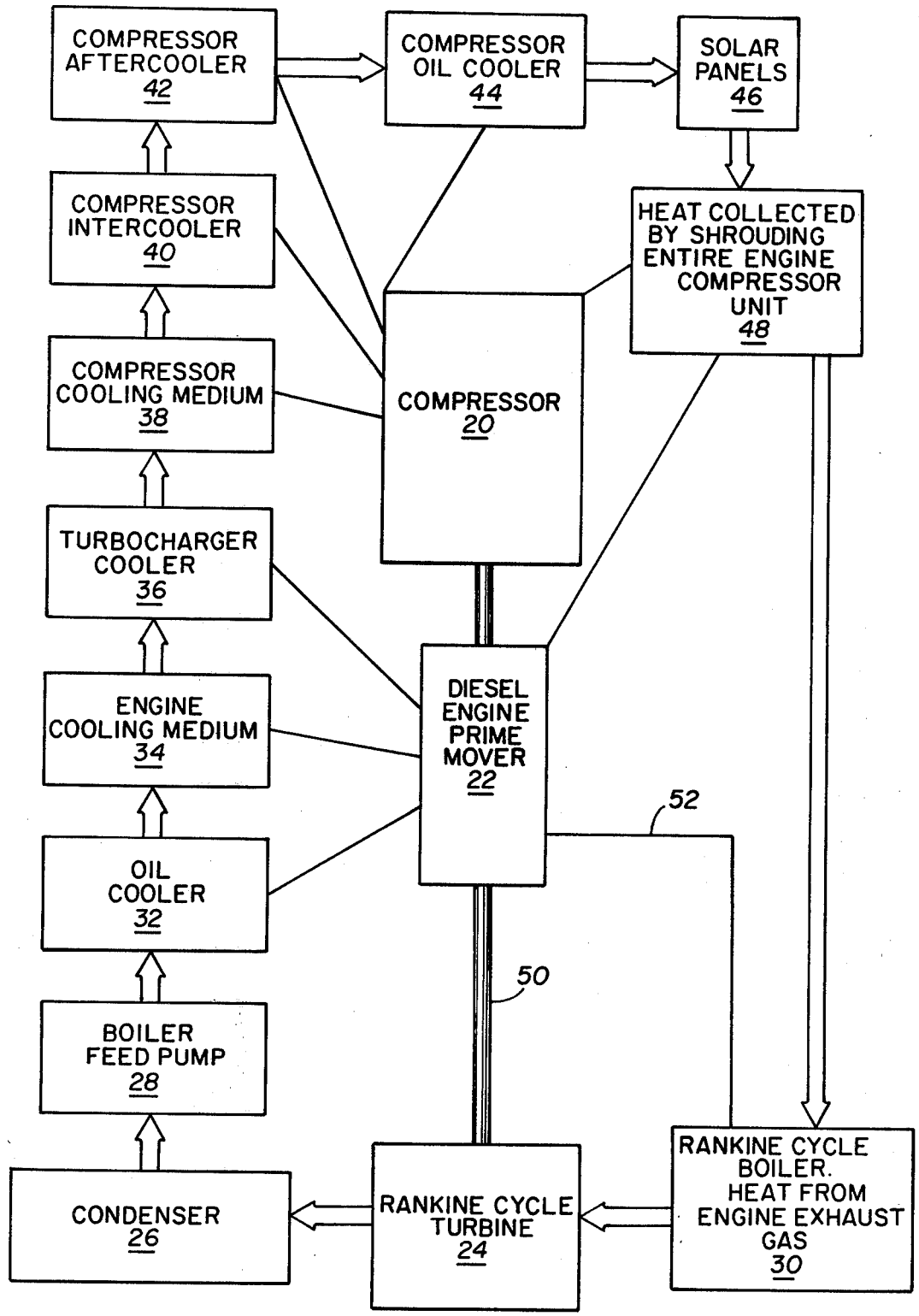
FIG. 3 is a schematic diagram of the system of the present invention.

Now, referring to FIG. 3, there is shown a compressor driven by a Diesel engine. As already mentioned, this description refers to a Diesel engine in an exemplary sense and it is to be distinctly understood that any prime mover for a compressor, as is well-known in the art, may be used. As shown in FIG. 3, compressor 20 is driven by Diesel engine 22. For the heat recovery, turbine 24, condenser 26, pump 28, and boiler 30 are provided. The working fluid is pumped by pump 28 to one or more heat exchangers which are schematically shown in FIG. 3 as engine oil cooler 32, engine cooling medium 34, turbo charger cooler 36, compressor cooling medium 38, compressor intercooler 40, compressor aftercooler 42, and compressor oil cooler 44. In addition, there are the optional solar panels 46 which can be used in certain geographical areas. Also, heat can be collected by the shroud 48. The pre-heated working fluid emerging from the one or more heat exchangers 32 through 48, passes to boiler 30 where it is vaporized and, if there is enough heat, superheated. The vaporized working fluid passes to turbine 24 to drive the turbine and then to condenser 26 whereupon the condensed working fluid passes to pump 28 and begins the cycle again. Turbine 24 is operatively connected to the Diesel engine shaft by means of shaft coupling 50. Heat for boiler 30 comes from the Diesel engine exhaust through means 52.

Thus, it will be appreciated that much of the otherwise wasted heat from the compressor-prime mover system is recovered by use of the Rankine cycle system and re-used. The advantage in fuel economy cannot be overestimated since the cost of fossil fuel has skyrocketed. Accordingly, it will be seen that the objects set forth hereinabove have been successfully achieved. Since many embodiments may be made of the instant inventive concepts and since many modifications may be made of the embodiment hereinbefore described, it is to be understood that all matter herein is to be interprted merely as illustrative and not in a limiting sense, the invention being defined by the following claims.

What is claimed is:

1. A method of recovering wasted energy from a combination of a gas compressor and a prime mover for said compressor, comprising passing a working fluid through at least one heat exchanger means operatively connected to said compressor and said prime mover to recover heat therefrom and thereby pre-heat said working fluid, passing said heated working fluid through boiler means, providing heat to said boiler means from said prime mover exhaust system to thereby vaporize said working fluid, passing said vaporized working fluid through turbine means, passing said vaporized working fluid to condenser means, passing the condensed working fluid to feed pump means, repeating the aforesaid steps, and utilizing the thus obtained shaft power of said turbine means to provide working energy.

2. A method as defined in claim 1, wherein said heat recovered from said compressor and said prime mover is extracted from the compressor cooling medium, compressor intercooler, compressor aftercooler, compressor oil cooler, prime mover oil cooler, prime mover cooling medium, prime mover turbocharger cooler, or insulating shroud.

3. A method as defined in claim 2, wherein said working fluid is further pre-heated by the use of solar panels.

4. In combination, prime mover means, gas compressor means driven by said prime mover means, heat exchange means operatively connected to said compressor means and said prime mover means to remove heat therefrom and transfer the same to a working fluid to thereby pre-heat said working fluid, boiler means for vaporizing said working fluid, means for extracting exhaust heat from said prime mover means and supplying same to said boiler means, turbine means driven by said vaporized working fluid, condenser means for condensing said working fluid, pump means for supplying said working fluid to said pre-heating means and to transmit said working fluid successively to said boiler means, turbine means, and condenser means.

5. The apparatus of claim 4, wherein the shaft of said turbine means is operatively connected to said prime mover means or said condenser means to thereby provide part of the driving power for said condenser means.

6. The apparatus of claim 4, wherein said pre-heating means comprises at least one heat exchanger and removes heat from said compressor means and said prime mover means through the compressor cooling medium, compressor intercooler, compressor aftercooler, compressor oil cooler, prime mover oil cooler, prime mover cooling medium, prime mover turbocharger cooler, and insulating shroud.

7. The apparatus of claim 6, wherein said pre-heating means comprises a plurality of heat exchangers with each heat exchanger removing heat from one of said compressor cooling medium, compressor intercooler, compressor aftercooler, compressor oil cooler, prime mover oil cooler, prime mover cooling medium, prime mover turbocharger cooler, and insulating shroud.

8. The apparatus of claim 7, wherein said heat exchangers are arranged in series.

9. The apparatus of claim 7, wherein said heat exchangers are arranged in parallel.

10. The apparatus of claim 7, wherein said heat exchangers are arranged in series-parallel.

* * * * *